Dec. 1, 1925.
J. M. JACKSON
CIGAR LIGHTER
Filed Feb. 14, 1925
1,564,072
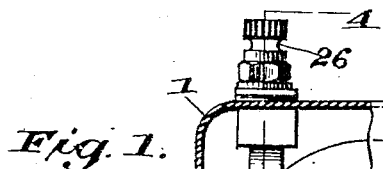
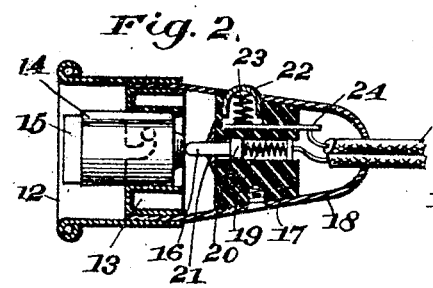
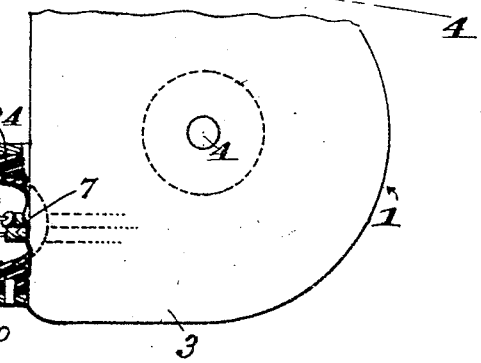
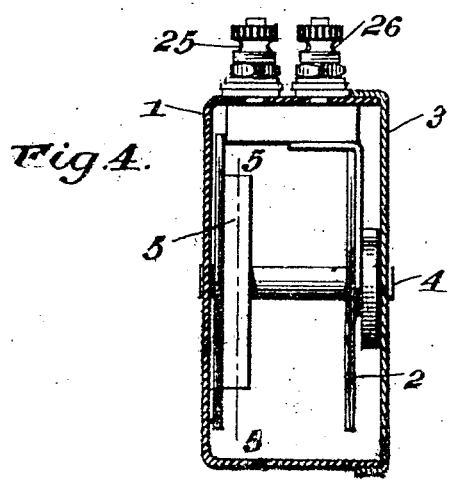
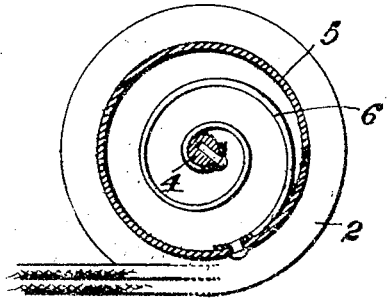
WITNESSES
INVENTOR
J. M. Jackson.
BY
ATTORNEYS Patented Dec. 1, 1925.

1,564,072

UNITED STATES PATENT OFFICE.

JAMES MADISON JACKSON, OF PARKERSBURG, WEST VIRGINIA.

CIGAR LIGHTER.

Application filed February 14, 1925. Serial No. 9,217.

*To all whom it may concern:*

Be it known that I, JAMES M. JACKSON, a citizen of the United States, and resident of Parkersburg, in the county of Wood and State of West Virginia, have invented certain new and useful Improvements in Cigar Lighters, of which the following is a specification.

This invention relates to improvements in cigar lighters, and it consists of the constructions, combinations and arrangements herein described and claimed.

An object of the invention is to provide an electrical cigar lighter of the extension-cord type, the arrangement being such that an electrical heating circuit is closed as soon as the thimble is pulled forwardly toward the smoker preparatory to lighting a cigar.

Another object of the invention is to provide a cigar lighter of the character stated, also having such provision as will again open the circuit when the thimble is released and permit it to fly back into the shell.

Another object of the invention is to provide a device of the character described which is capable of being used as an extension electric lamp, it being a mere matter of exchanging the preferred electrical heating unit for a standard base lamp to serve the latter purpose.

Other objects and advantages appear in the following specification, reference being had to the accompanying drawing, in which Figure 1 is a sectional view of the spool box and shell, portions of the device being shown in elevation.

Figure 2 is a central longitudinal section of the lighting thimble which cooperates with said shell.

Figure 3 is a view partly in elevation and partly in section illustrating the action when the thimble is placed in the resting position in the shell.

Figure 4 is a cross section on the line 4—4 of Figure 1.

Figure 5 is a detail section on the line 5—5 of Figure 4, and showing a detail of the cable spool.

In carrying out the invention provision is made of a box 1 in which a spool 2 is rotatably mounted. The box has a cover 3 (Fig. 4) which, when placed upon the otherwise open side of the box, assists in holding the shaft 4 of the spool in position. The spool includes a drum 5 (Figs. 4 and 5) in which a spring 6 is so arranged as to continuously tend to turn the spool in the counter-clockwise direction and thereby keep the electric cable 7 wound up within the box 1.

Extending from the box 1 is a sleeve or shell 8. This shell is externally threaded part of the way to receive one or more nuts 9 by means of which connection is intended to be made with a support. Only one nut is indicated in the drawing, but in practice several are obviously used. The shell 8 has an internal insulating bushing 10 with a tapering bore 11. The electric cable 7 extends out through the bore when the cigar lighter is in use as shown in Figures 1 and 2. A thimble 12 carries a receptacle 13 into which is insertible the base 14 of either a small electric lamp, or preferably (to carry out the purpose of the invention) the base of a suitable heating element 15. This element is of the electrical resistance variety, being of such character that when the electrical current passes therethrough it becomes sufficiently hot to light the end of a cigar introduced in the open end of the thimble 12.

The end of the base 14 is engageable with the center contact 16 which is carried by an insulating plug 17 in the conical end 18 of the thimble. The center contact is pressed by a spring 19 in one direction and is prevented from being moved out of the bore of the plug by a head 20 and a closure 21.

A side contact 22 is operable at an opening in the conical end 18. A spring 23 tends to press the contact 22 outwardly and thus make contact with the wall of the opening. The spring engages a strip 24 with which one wire of the cable 7 connects as shown. The other wire of the cable has suitable connection with the spring 19. It is readily seen that when the thimble 12 is extended as shown in Figure 2, the side contact 22 will be in engagement with the conical end 18 (which is made of metal) establishing a circuit through the base 14 and element 15 so that sufficient heat may be had for the lighting of the cigar.

Electrical current is conducted to the cable in any suitable manner. In practice the arrangement must be such that current will be conductor regardless of the fact that the spool 2 is adapted for turning. Conventional sliding contacts may be used for the purpose, and current is supplied at terminals 25 and 26. However, the spool 2, its mounting in the box 1 and the manner of supplying the electrical current may be conventional, the particular feature to be borne in mind being the construction of the thimble 12 and the shell 8 with which it co-operates.

The operation is readily understood. As already stated, the tendency of the spring 6 (Fig. 5) is to turn the spool 2 in the counter-clockwise direction so as to wind up the cable 7 and hold the thimble 12 in the space within the shell 8. The position then assumed is illustrated in Figure 3. The conical end 18 will be held in engagement with the tapering wall or bore 11 of the insulating bushing 10. The side contact 22 being engaged with the tapering bore, is depressed against the tension of the spring 23, causing disconnection of the contacts from the metallic body of the conical end. This breaks the electrical circuit which may otherwise be traced through the lamp base 14.

Upon desiring to use the cigar lighter the thimble 12 is taken hold of and pulled outward. The cable 7 will unreel from the spool. The spring 23 will press the otherwise unobstructed side contact 22 into engagement with the wall of the opening in the conical end 18, establishing the electrical circuit spoken of before and causing a desired heating of the element 15. This element, as already stated, may be of any conventional resistance type. After the cigar has been lighted, the user may simply let go of the spindle 12 whereupon the spring 6 (which was previously put under tension) will turn the spool 10 until the conical end 18 finds its way into the shell 8. The side contact 22 is again depressed, and the electrical circuit is open.

While the construction and arrangement of the improved cigar lighter is that of a generally preferred form, obviously modifications and changes may be made without departing from the spirit of the invention or the scope of the claims.

I claim:—

1. A cigar lighter comprising a device arranged to be taken into the hand and freely moved about, said device comprising a thimble, a receptacle in the thimble, an element to be heated carried by the receptacle, a conical end extending from the thimble, an insulating bushing situated in said end, a spring contact mounted in the bushing and being movable into an opening in said conical end to engage the wall of the opening, an electrical cable extending into the conical end representing a circuit one side of which has connection with the contact, the other side of which has connection with one terminal of said element, a relatively fixed insulating bushing having a tapering bore into which said conical end is insertible to cause depression of the contact and breaking of the circuit, a box having a shell by which said last bushing is carried, and means in the box upon which the cable is capable of winding.

2. A device of the character described comprising an element to be heated, means by which said element is carried including a metallic thimble with which one terminal of said element is in electrical connection, a metallic extension upon the thimble having an opening, an electrical circuit including a cable, means by which one of the wires of the cable is connected to the remaining terminal of said element, an insulating plug situated in said extension, a spring contact guided in said insulating plug at which contact the other wire of said cable is connected, said spring contact entering said opening and completing the electrical circuit through said element and the wall of the opening, spring tension means by which the cable is wound, and means including an insulating bushing by which said extension is receivable, the engagement of said spring contact with the wall of said bushing pressing the contact out of engagement with the wall of said opening and thereby opening the circuit of said element.

JAMES MADISON JACKSON.